US 9,848,581 B1

(12) United States Patent
Dahlquist

(10) Patent No.: US 9,848,581 B1
(45) Date of Patent: Dec. 26, 2017

(54) INTERNALLY LIGHTED NAIL TRIMMER

(71) Applicant: Kevin James Dahlquist, Charlotte, NC (US)

(72) Inventor: Kevin James Dahlquist, Charlotte, NC (US)

(*) Notice: Subject to any disclaimer, the term of this patent is extended or adjusted under 35 U.S.C. 154(b) by 146 days.

(21) Appl. No.: 14/844,962

(22) Filed: Sep. 3, 2015

Related U.S. Application Data

(60) Provisional application No. 62/045,158, filed on Sep. 3, 2014.

(51) Int. Cl.
*B25B 23/18* (2006.01)
*A01K 17/00* (2006.01)
*A01K 13/00* (2006.01)
*F21V 33/00* (2006.01)

(52) U.S. Cl.
CPC .............. *A01K 17/00* (2013.01); *A01K 13/00* (2013.01); *F21V 33/0004* (2013.01)

(58) Field of Classification Search
CPC ................................ A01K 13/00; A01K 17/00
USPC .................................. 119/610, 600; 362/119
See application file for complete search history.

(56) References Cited

U.S. PATENT DOCUMENTS

| 4,956,915 A * | 9/1990 | Anderson | A45D 29/02 132/73.5 |
| 5,546,658 A * | 8/1996 | MacLeod | A45D 29/18 30/124 |
| 5,931,167 A * | 8/1999 | Coleman | A45D 26/0066 132/73 |
| 6,220,251 B1 * | 4/2001 | Jeong | A45D 29/04 132/73.5 |
| 7,000,321 B1 | 2/2006 | Rodgers | |
| 7,137,356 B2 | 11/2006 | Huggans | |
| 7,217,001 B2 | 5/2007 | Vrsalovic et al. | |
| 7,263,775 B2 | 9/2007 | Moulton, III | |
| 7,464,665 B1 | 12/2008 | Rogers et al. | |
| 7,640,892 B2 * | 1/2010 | Huggans | A01K 13/00 119/601 |
| 2006/0158871 A1 * | 7/2006 | Hopkins | A01K 13/00 362/119 |
| 2007/0028936 A1 * | 2/2007 | Kriser | A45D 29/05 132/76.4 |

* cited by examiner

*Primary Examiner* — Andrew Coughlin
*Assistant Examiner* — Eric T Eide
(74) *Attorney, Agent, or Firm* — Tillman Wright, PLLC; James D. Wright; David R. Higgins

(57) ABSTRACT

A pet nail trimmer includes a pair of handles, a housing, a guillotine assembly, and a light. The guillotine assembly extends from the housing and is actuated by the handles. The assembly includes a blade and a frame that are in parallel to one another and that define a cutting opening that includes a first end nearest the handles, a second end opposite the first end, and two sides. The light is disposed within and along a side of the cutting opening, adjacent the blade and the frame, and is oriented to direct light across the cutting opening from one side thereof toward the other. The light is directed in a direction that is generally perpendicular to the handles.

17 Claims, 19 Drawing Sheets

INTERNALLY LIGHTED NAIL TRIMMER

CROSS-REFERENCE TO RELATED APPLICATION

The present application is a U.S. nonprovisional patent application of, and claims priority under 35 U.S.C. §119(e) to, U.S. provisional patent application Ser. No. 62/045,158, filed Sep. 3, 2014, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to pet nail trimmers, and, in particular, to light assemblies for pet nail trimmers.

Background

Pet nail trimmers are well known. Common types include scissors-type nail trimmers and guillotine-type nail trimmers. Different variations exist to improve comfort, ease of use, and the like.

One area of focus has been the use of sensors to try to help the user avoid mistakes (including cutting actions that cause pain or excessive discomfort for the pet) and/or carry out trimming more efficiently. These have had limited success.

Another area of focus has been the inclusion of a built-in or built-on light source to help illuminate the trimming process. For example, one guillotine-type nail trimmer is known that includes a gooseneck lamp extending over the top of the cutting opening, thereby providing light for the trimming process. This arrangement is unwieldy, however, and also creates undesirable shadows in the area of cutting. Furthermore, the light is provided in the form of direct light, which provides no assistance in illuminating the interior of a pet nail.

Thus, a continued need exists for improvement in the area of pet nail trimmers.

SUMMARY OF THE PRESENT INVENTION

Broadly defined, the present invention according to one aspect is a pet nail trimmer, including: a pair of handles; a housing; a guillotine assembly, extending from the housing and actuated by the handles, the assembly having a blade and a frame that are in parallel to one another and that define a cutting opening that has a first end nearest the handles, a second end opposite the first end, and two sides; and a light, disposed within and along a first of the two sides of the cutting opening, adjacent the blade and the frame, and oriented to direct light across the cutting opening from the first side thereof toward the second side thereof, the light being directed in a direction that is generally perpendicular to the handles.

In a feature of this aspect, the frame includes a cutting edge.

In another feature of this aspect, the blade is arranged to move in a longitudinal direction along the frame.

In another feature of this aspect, the light is oriented to direct light in a direction that is co-planar with at least one of the blade and frame.

In another feature of this aspect, a magnifier is positioned adjacent the cutting opening. In further features, the magnifier has a convex lens disposed over, and in parallel to, the cutting opening; the magnifier has a box-like structure surrounding the cutting opening and having convex walls; and/or the box-like structure is hinged so as to enable the structure to be rotated away from the cutting opening.

In another feature of this aspect, the light is a first light disposed within and along a first side of the cutting opening, wherein the pet nail trimmer has a second light disposed within and along a second side of the cutting opening adjacent the blade and the frame and facing the first light, and wherein the second light is oriented to direct light across the cutting opening from the second side thereof toward the first side, the light being directed in a direction that is generally perpendicular to the handles. In further features, the first and second lights are oriented to direct light toward each other across the cutting opening.

In another feature of this aspect, the light is attached to the frame of the guillotine assembly.

In another feature of this aspect, of the guillotine assembly, one of the blade and the frame is stationary relative to the housing and the other of the blade and the frame is movable relative to the housing, and wherein the light is attached to the one of the blade and the frame that is stationary.

In another feature of this aspect, the blade is movable relative to the frame, wherein movement of the blade relative to the frame defines a direction of translation, and wherein the light is directed in a direction that is generally perpendicular to the direction of translation.

Broadly defined, the present invention according to another aspect is a pet nail trimmer, including: a pair of handles; a housing; a guillotine assembly, extending from the housing and actuated by the handles, the assembly having a blade and a frame that are in parallel to one another and that define a cutting opening that has a first end nearest the handles, a second end opposite the first end, and two sides; a first light, disposed within and along a first of the two sides of the cutting opening, adjacent the blade and the frame; and a second light, disposed within and along a second of the two sides of the cutting opening, adjacent the blade and the frame; wherein the first and second lights are oriented to direct light toward each other across the cutting opening.

Broadly defined, the present invention according to another aspect is a pet nail trimmer, including: a pair of handles; a housing; a guillotine assembly, extending from the housing and actuated by the handles, the assembly having a blade and a frame that are in parallel to one another and that define a cutting opening that has a first end nearest the handles, a second end opposite the first end, and two sides, wherein the blade is movable relative to the frame, and wherein movement of the blade relative to the frame defines a direction of translation; and a light, disposed within and along a first of the two sides of the cutting opening, adjacent the blade and the frame, and oriented to direct light across the cutting opening from the first side thereof toward the second side thereof, the light being directed in a direction that is generally perpendicular to the direction of translation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
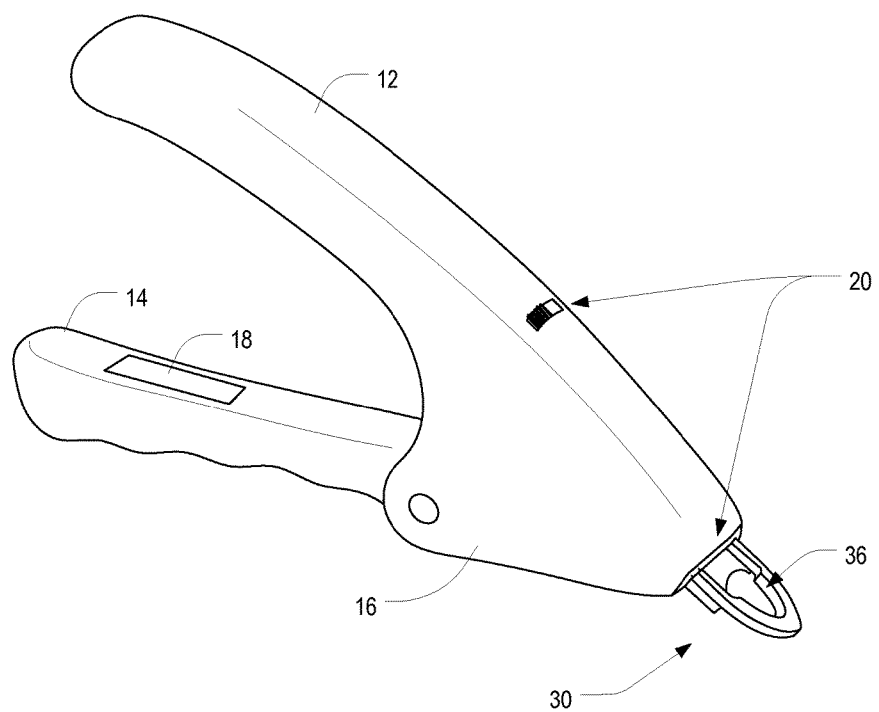
FIG. 1 is a perspective view of an internally lighted guillotine-type nail trimmer in accordance with one or more preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 is a perspective view of an internally lighted guillotine-type nail trimmer 10 in accordance with one or more preferred embodiment of the present invention. As shown therein, the nail trimmer 10 includes a pair of handles 12,14, a main housing 16, a guillotine assembly 30, and a light assembly 20. The handles 12,14 and main housing 16 are generally conventional in design, but with allowance to accommodate the light assembly 20 and guillotine assembly 30.

Figure 2:
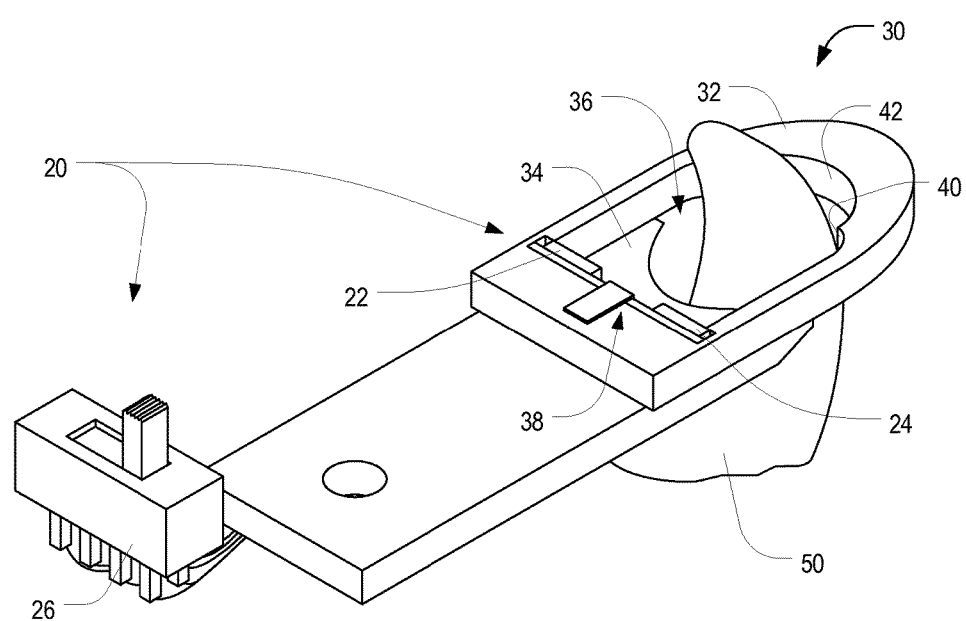
FIG. 2 is an isometric view of the light assembly and guillotine assembly of FIG. 1, shown in operative position around a pet nail.
Figure 3:
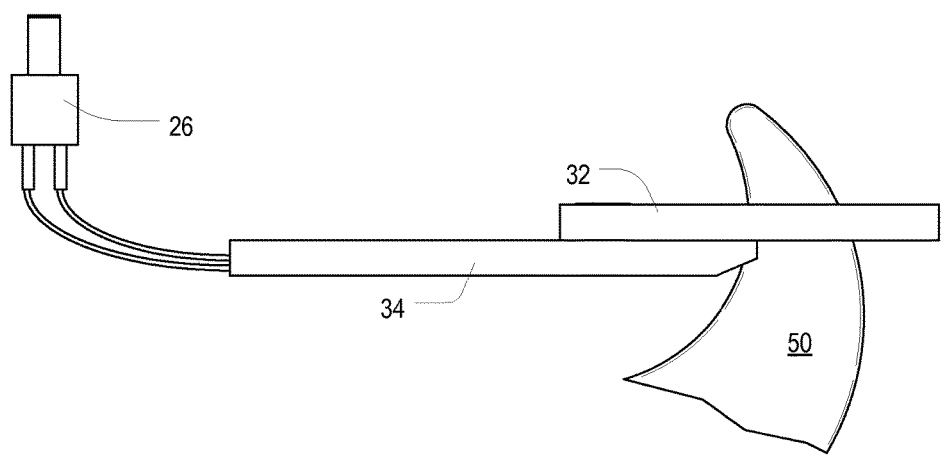
FIG. 3 is a side view of the light assembly and guillotine assembly of FIG. 1, shown in operative position around a pet nail.
Figure 4:
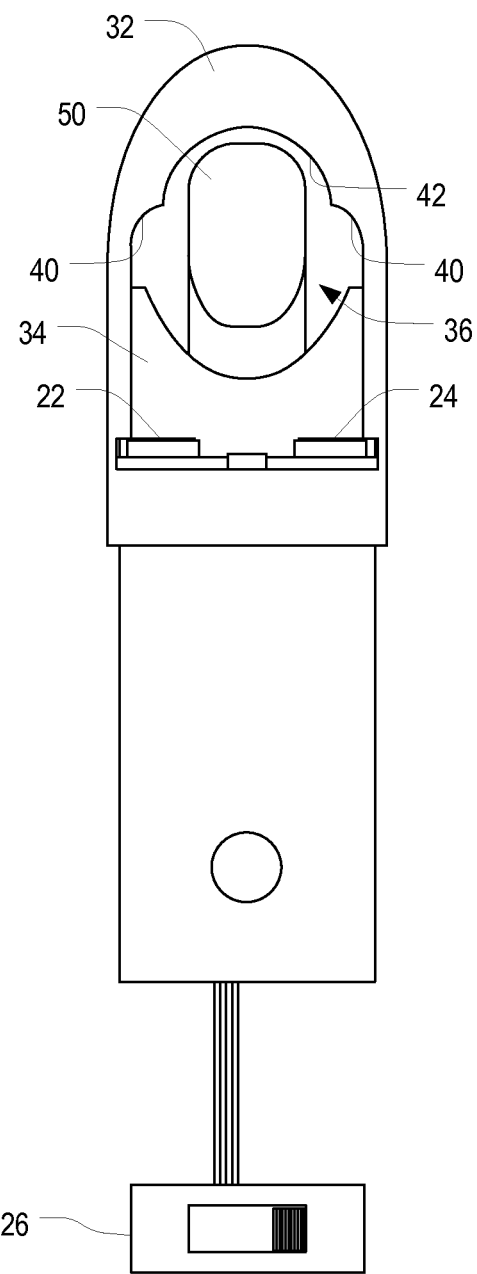
FIG. 4 is a top view of the light assembly and guillotine assembly of FIG. 1, shown in operative position around a pet nail.

FIGS. 2-4 are an isometric view, a side view, and a top view, respectively, of the light assembly 20 and guillotine assembly 30 of FIG. 1, shown in operative position around a pet nail 50. The light assembly 20 and guillotine assembly 30 are at least partially housed in, or extend from, the main housing 16 and one or both handles 12,14. As shown therein, the guillotine assembly 30 includes a stationary blade or frame 32 and a moving blade 34 which together define a cutting opening 36. In some embodiments, the stationary blade or frame 32 does not include a sharpened cutting edge, while in other embodiments it does. The two blades 32,34 may be coupled together in conventional manner such that the moving blade 34 slides back and forth relative to the stationary blade or frame 32. As is well known, when the moving blade 34 slides out of its normal, recessed position and toward (into) the cutting opening 36, the diameter of the cutting opening 36 is reduced. The movement of the moving blade 34 is actuated conventionally by squeezing the handles 12,14 together, thus enabling a considerable amount of force to be applied to a pet nail 50 that is inserted into the cutting opening 36, but with a relatively minimal effort. As is conventional, the moving blade 34 tends to catch and pin the nail 50 against the stationary blade or frame 32, and once trapped, to cut or cleave the pet nail 50 at the point of contact.

The light assembly 20 includes at least one and preferably two small light sources 22,24 disposed within the guillotine assembly 30 and directed toward the cutting opening 36. The lights 22,24 are preferably very small surface-mount LED lights that are installed in a slot 38 in the steel frame of the guillotine assembly 30. Simple white LEDs may be used, but in some embodiments, various other LEDs or other light sources, producing light with various wavelengths, may be substituted. For example, the use of UV LEDs, providing near-ultraviolet ("black") light, may provide increased visual contrast. As a non-limiting example, it may be useful to incorporate UV LEDs providing 415 nm UV light. It will be appreciated that light may be provided in any visible wavelength without departing from the scope of the present invention.

The light assembly 20 may include a switch assembly 26, which in some embodiments is a multi-position switch assembly to enable the lights 22,24 to be activated independently or simultaneously. A three position slide switch may be utilized. Additionally or alternatively, a switch contact (not shown) may be used to activate the illumination whenever the handles 12,14 are compressed together and/or when a safety (for example, a mechanical safety that holds the handles in a fixed position relative to each other in order to prevent unintentional cutting action by the guillotine assembly but that may be released to enable operability of the guillotine assembly) is released.

In another feature, one or more internal surfaces of the guillotine assembly 30, such as some or all of the surfaces 40,42 of the stationary blade or frame 32 that face the cutting opening 36, may be curved or angled such that some or all of the light from the light sources 22,24 is directed or redirected directly toward the cutting opening 36, and thus toward a nail 50 inserted therein. These surfaces 40,42 may be selectively cut and polished to heighten this effect and to maximize capture and redirection of light.

In fact, because pet nails 50 have a translucent attribute, the light may actually pass through the nail 50 from one side to the other. This reveals the animal's quick through the keratin of the nail 50 such that it can be either avoided or delicately trimmed. Because the light is not only directed toward or adjacent the cutting opening 36 but is also redirected around behind the nail 50 where it can backlight the nail 50, this characteristic can be taken advantage of for providing safer, less painful, and more efficient nail trimming than other nail trimmers, including those that have a light included therewith.

Figure 5:
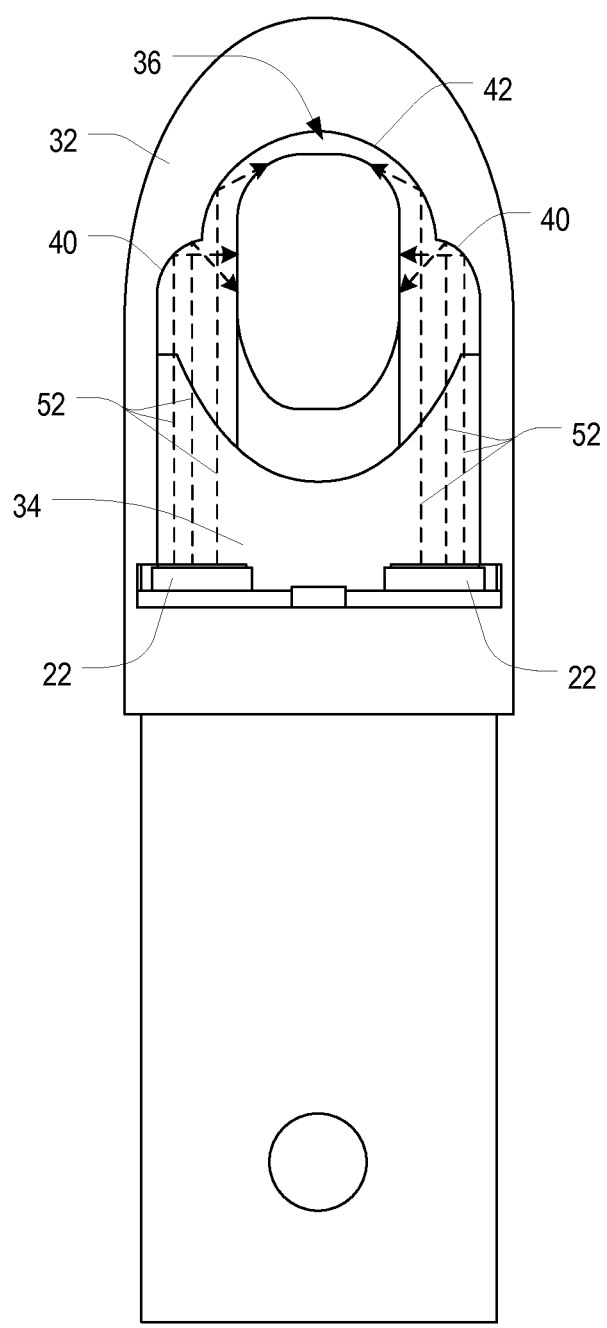
FIG. 5 is a top view of a portion of the light assembly and guillotine assembly of FIG. 4, illustrating the operation of the light assembly.

FIG. 5 is a top view of a portion of the light assembly 20 and guillotine assembly 30 of FIG. 4, illustrating the operation of the light assembly 20. In the illustrated embodiment, two side surfaces 40 (one on each side) and the end surface 42 include concave curvature, thereby achieving reflection of light 52 toward the cutting opening 36, and thus toward a pet nail 50 inserted therethrough.

Power may be supplied to the light assembly 20 via a battery source (not shown) that is disposed within a compartment 18 in one of the handles 14. Alternatively, the battery source may be disposed in the other handle 12, the main housing 16, or any combination thereof. The battery source may be a single AAA alkaline cell, three watch batteries, or any other suitable battery source.

Figure 6:
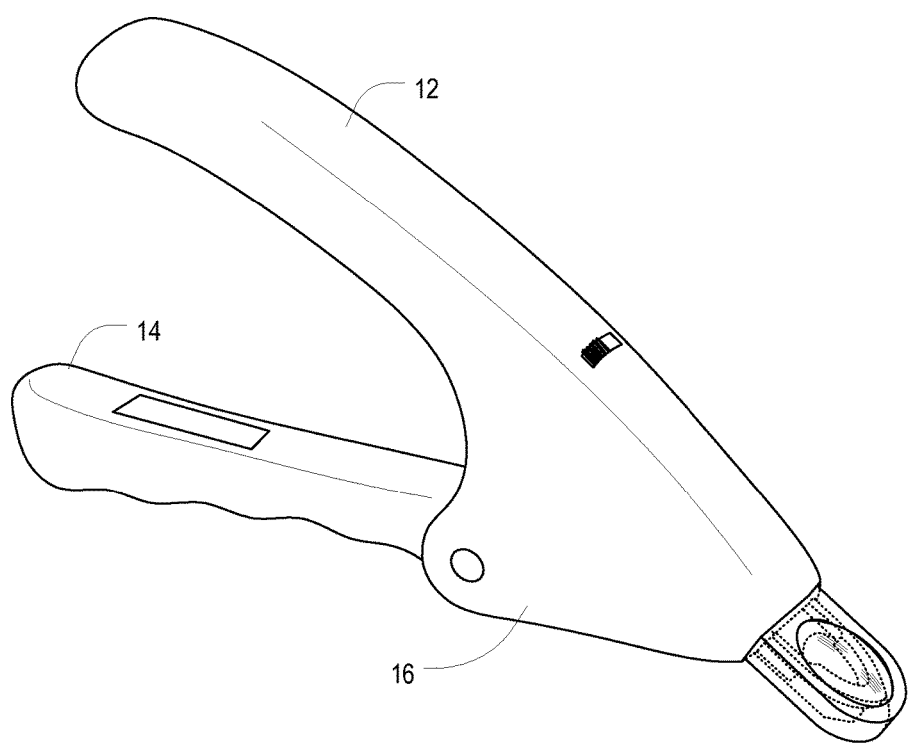
FIG. 6 is a perspective view of an internally lighted guillotine-type nail trimmer in accordance with another preferred embodiment of the present invention.
Figure 7:
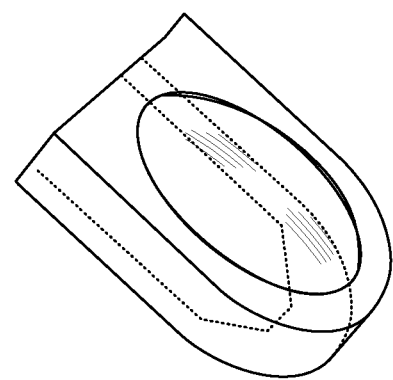
FIG. 7 is an enlarged perspective view of the multi-function cover of FIG. 6.

FIG. 6 is a perspective view of an internally lighted guillotine-type nail trimmer 110 in accordance with another preferred embodiment of the present invention. The trimmer 110 of FIG. 6 is similar to that of FIG. 1 but has a multi-function cover accessory surrounding the top and sides of the guillotine assembly 30. FIG. 7 is an enlarged perspective view of the multi-function cover of FIG. 6. The cover is transparent and includes a convex portion on its top for providing visual enlargement of the interior operational area to a user. The cover also aids in catching cut portions of nails and protects users, pets, and other people and objects in the immediate vicinity from accidentally being struck by the cut nail pieces and from accidentally entering the operational area. However, the cover (or its magnifying portion)

may certainly be omitted, or in some embodiments, the cover may be removable. In some of the latter embodiments, the cover may be detachable and reattachable.

Figure 8:
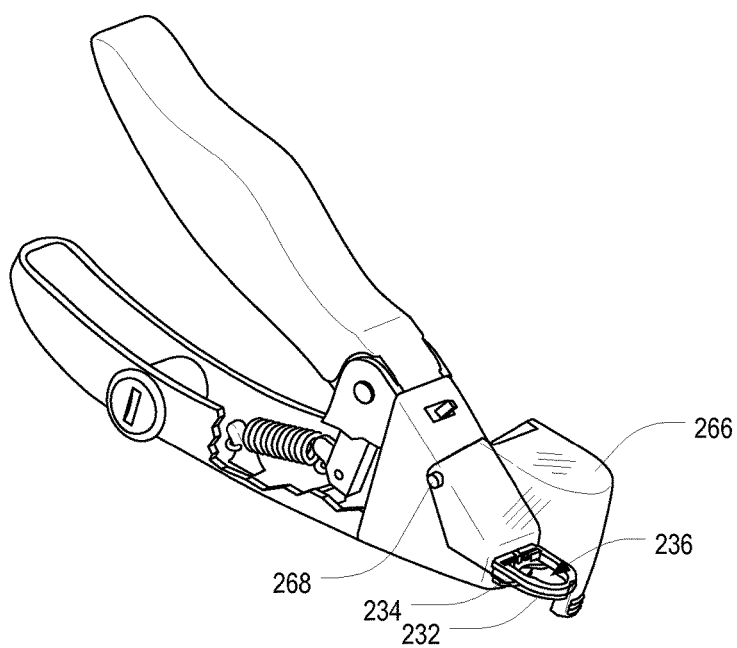
FIG. 8 is a partially fragmentary side orthogonal view of an internally lighted guillotine-type nail trimmer in accordance with another preferred embodiment of the present invention.
Figure 9:
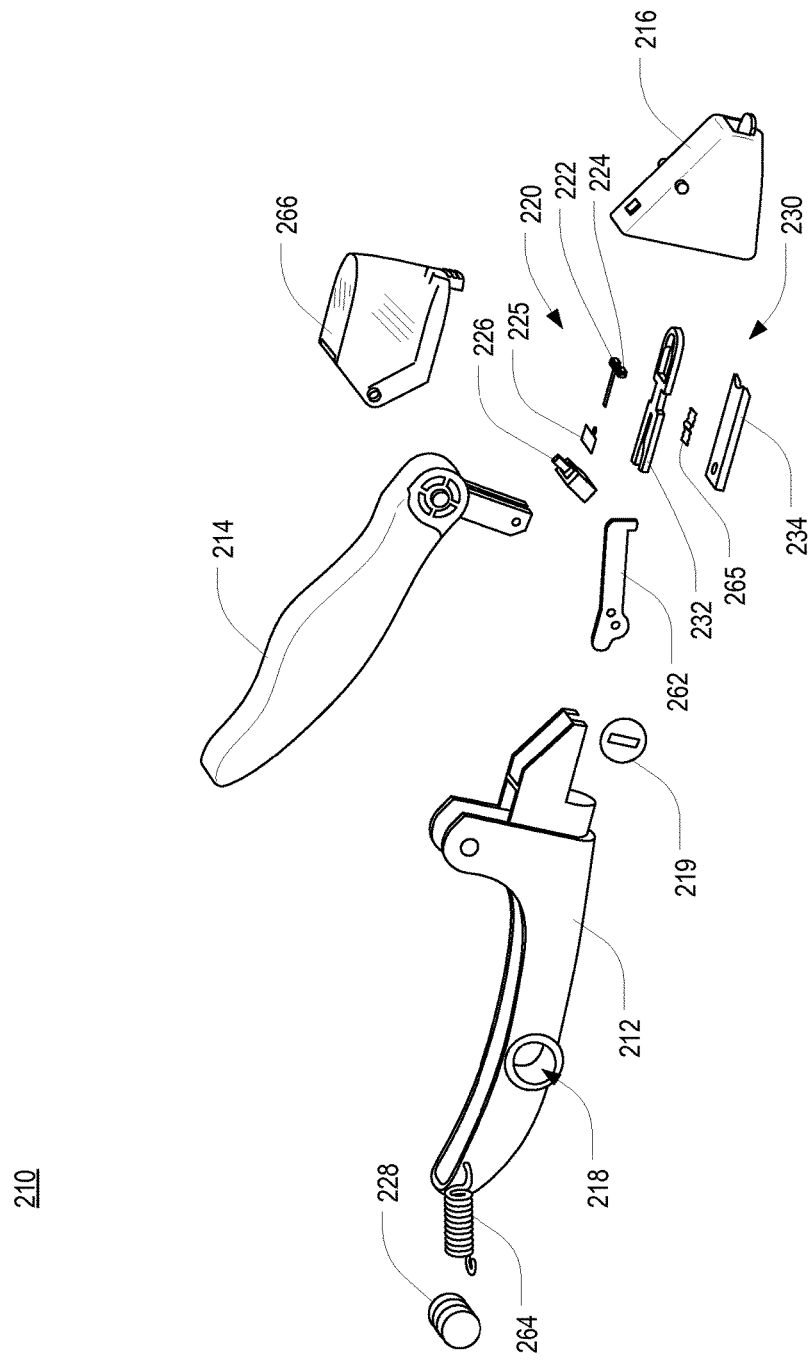
FIG. 9 is an exploded side orthogonal view of the internally lighted guillotine-type nail trimmer of FIG. 8.
Figure 10:
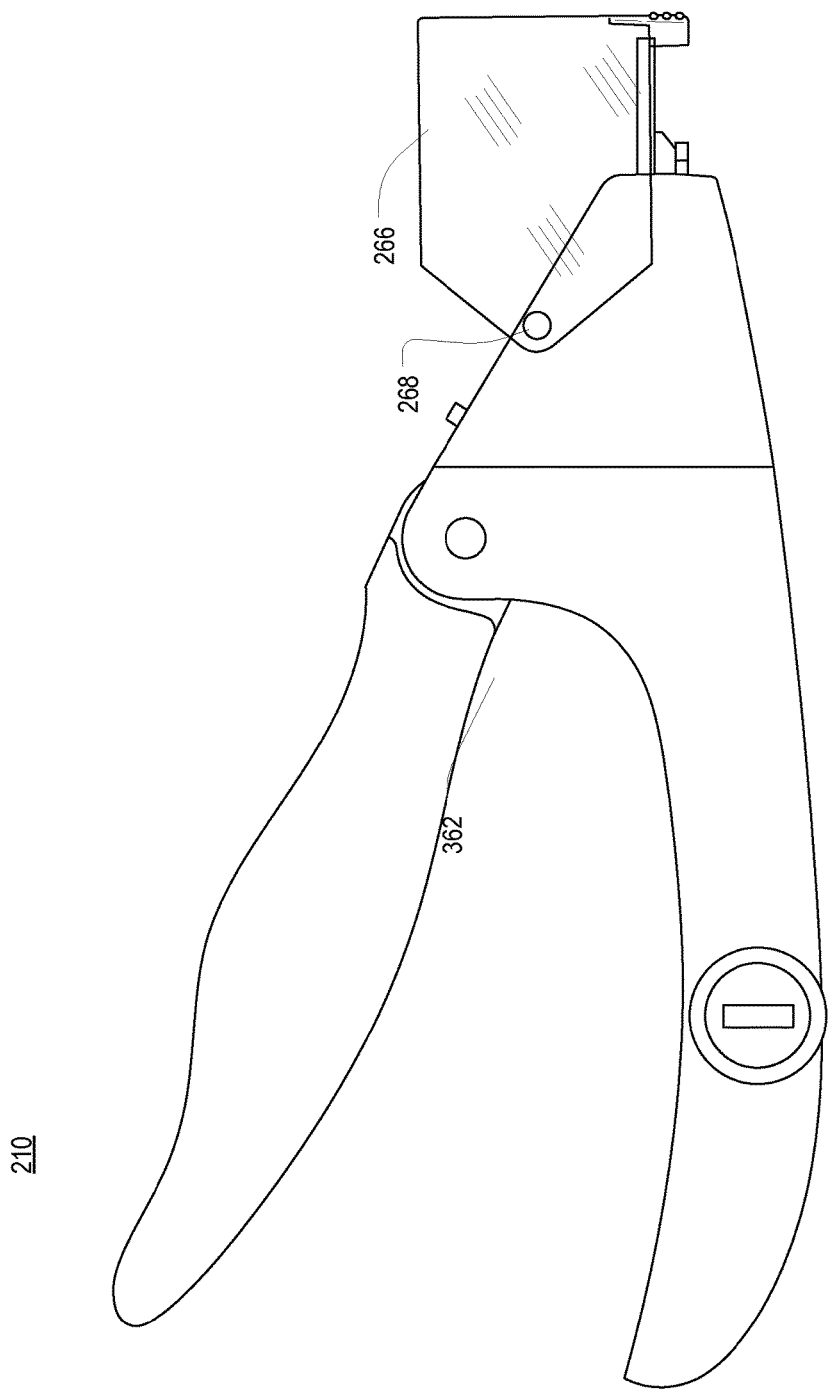
FIG. 10 is a side view of the internally lighted guillotine-type nail trimmer of FIG. 8.

FIG. 8 is a partially fragmentary side orthogonal view of an internally lighted guillotine-type nail trimmer 210 in accordance with another preferred embodiment of the present invention. FIG. 9 is an exploded side orthogonal view of the internally lighted guillotine-type nail trimmer 210 of FIG. 8. FIG. 10 is a side view of the internally lighted guillotine-type nail trimmer 210 of FIG. 8. As shown therein, the trimmer 210 includes a pair of handles 212,214, a main housing 216, a guillotine assembly 230, and a light assembly 220. The handles 212,214 and main housing 216 may be generally conventional in design, but with allowance to accommodate the light assembly 220 and guillotine assembly 230. The light assembly 220 and guillotine assembly 230 are at least partially housed in, or extend from, the main housing 216 and one or both handles 212,214.

The guillotine assembly 230 includes a stationary blade or frame 232, a moving blade 234, and a leaf spring 265. In some embodiments, the stationary blade or frame 232 does not include a sharpened cutting edge, while in other embodiments it does. The stationary blade or frame 232 and moving blade 234 together define a cutting opening 236. The two blades 232,234 may be coupled together in conventional manner such that the moving blade 234 slides back and forth relative to the stationary blade or frame 232. The leaf spring 265, which is optional, applies pressure to the cutting blade 234 against the blade frame 232 so that torque from the cutting process does not splay them apart. Other designs use an adjustable screw or other structures.

As is well known, when the moving blade 234 slides out of its normal, recessed position and toward (into) the cutting opening 236, the diameter of the cutting opening 236 is reduced. Movement of the moving blade 234 may be achieved, for example, via a pivot arm 262 that is coupled at one end to the moving blade 234 and is pivotably coupled near its other end to one of the handles 214, which serves as a lever. Thus, movement of the moving blade 234 may be actuated somewhat conventionally by squeezing the handles 212,214 together, thus pushing the moving blade 234 out of the housing 216. This enables a considerable amount of force to be applied to a pet nail 50 that is inserted into the cutting opening 236, but with a relatively minimal effort. As is conventional, the moving blade 234 tends to catch and pin the nail 50 against the stationary blade or frame 232, and once trapped, to cut or cleave the pet nail 50 at the point of contact. The moving blade 234 is then retracted within the housing 216 once again when the lever handle 214 is returned to its original position, with assistance in this regard provided by a spring 264 that is stretched when the handles 212,214 are squeezed and thus tends to pull the handles 212,214 apart when the handles 212,214 are released.

The light assembly 220 includes at least one and preferably two small light sources 222,224 disposed within the guillotine assembly 230 and directed toward the cutting opening 236. The lights 222,224 are preferably very small surface-mount LED lights that are installed in a slot in the steel frame of the guillotine assembly 230. Simple white LEDs may be used, but in some embodiments, various other LEDs or other light sources, producing light with various wavelengths, may be substituted. For example, the use of UV LEDs, providing near-ultraviolet ("black") light, may provide increased visual contrast. As a non-limiting example, it may be useful to incorporate UV LEDs providing 415 nm UV light. It will be appreciated that light may be provided in any visible wavelength without departing from the scope of the present invention.

The light assembly 220 may include a switch assembly 226, which in some embodiments is a multi-position switch assembly to enable the lights 222,224 to be activated independently or simultaneously. A three position slide switch may be utilized. Additionally or alternatively, a switch contact (not shown) may be used to activate the illumination whenever the handles 212,214 are compressed together and/or when a safety (for example, a mechanical safety that holds the handles in a fixed position relative to each other in order to prevent unintentional cutting action by the guillotine assembly but that may be released to enable operability of the guillotine assembly) is released.

As with the trimmer 10 of FIGS. 1-5, one or more internal surfaces of the guillotine assembly 230, such as some or all of the surfaces of the stationary blade or frame 232 that face the cutting opening 236, may be curved or angled such that some or all of the light from the light sources 222,224 is directed or redirected directly toward the cutting opening 236, and thus toward a nail 50 inserted therein. These surfaces may be selectively cut and polished to heighten this effect and to maximize capture and redirection of light.

Power may be supplied to the light assembly 220 via a battery source 228 that is disposed within a compartment 218 and protected by a battery cover 219 in one of the handles 212. Alternatively, the battery source may be disposed in the other handle 214, the main housing 216, or any combination thereof. The battery source 228 may be a single AAA alkaline cell, three watch batteries, or any other suitable battery source. Electrical wiring connects the battery to the lights 222,224. The wiring may be protected by a cover (not shown).

It will be appreciated that the nail trimmer 210 of FIGS. 8-10 includes a transparent cover accessory 266 with convex curvature on the sides (front, left and right) thereof to provide visual enlargement to a user. The cover accessory 266 includes a hinge 268 so as to be easily rotated upward and out of the way for convenience or to empty the contents thereof. However, the cover accessory (or its magnifying portion) may certainly be omitted, or in some embodiments, the cover accessory may be removable. In some of the latter embodiments, the cover accessory may be detachable and reattachable.

Figure 11:
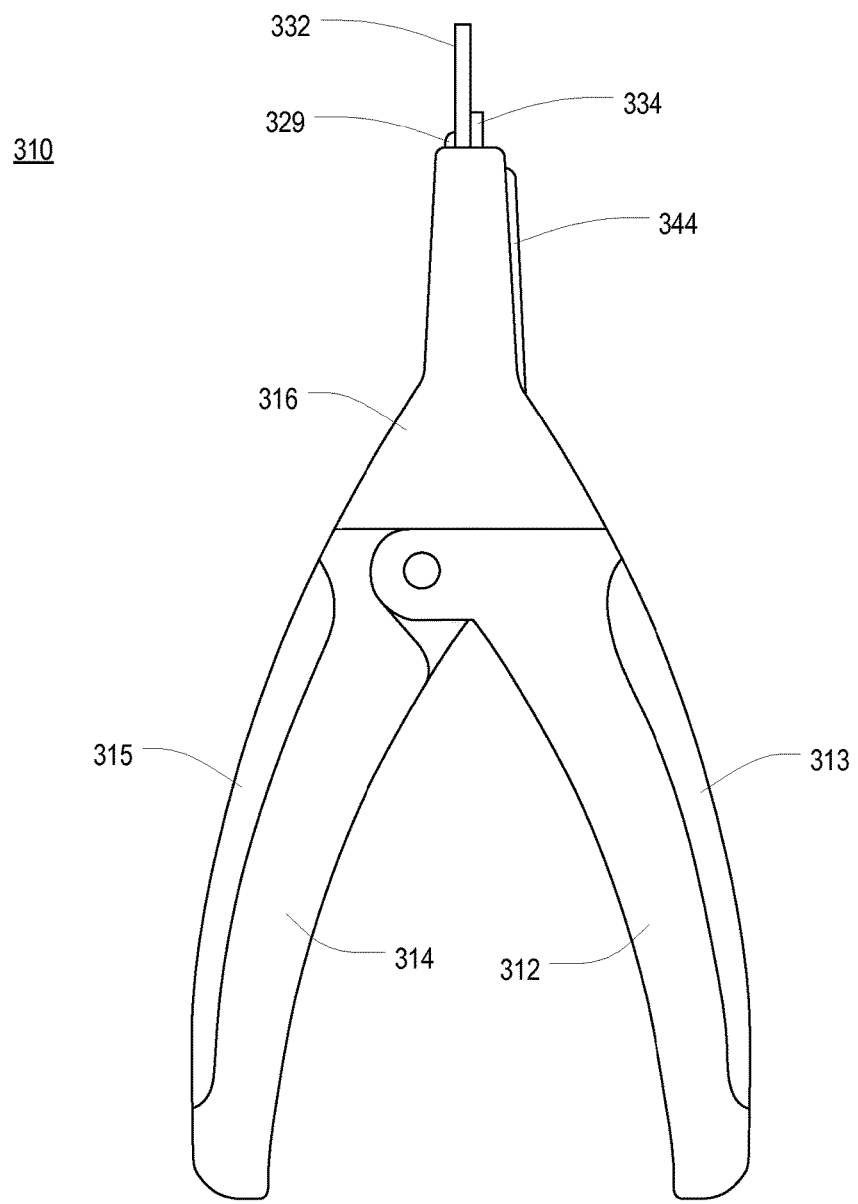
FIG. 11 is a side view of an internally lighted guillotine-type nail trimmer in accordance with another preferred embodiment of the present invention.
Figure 12:
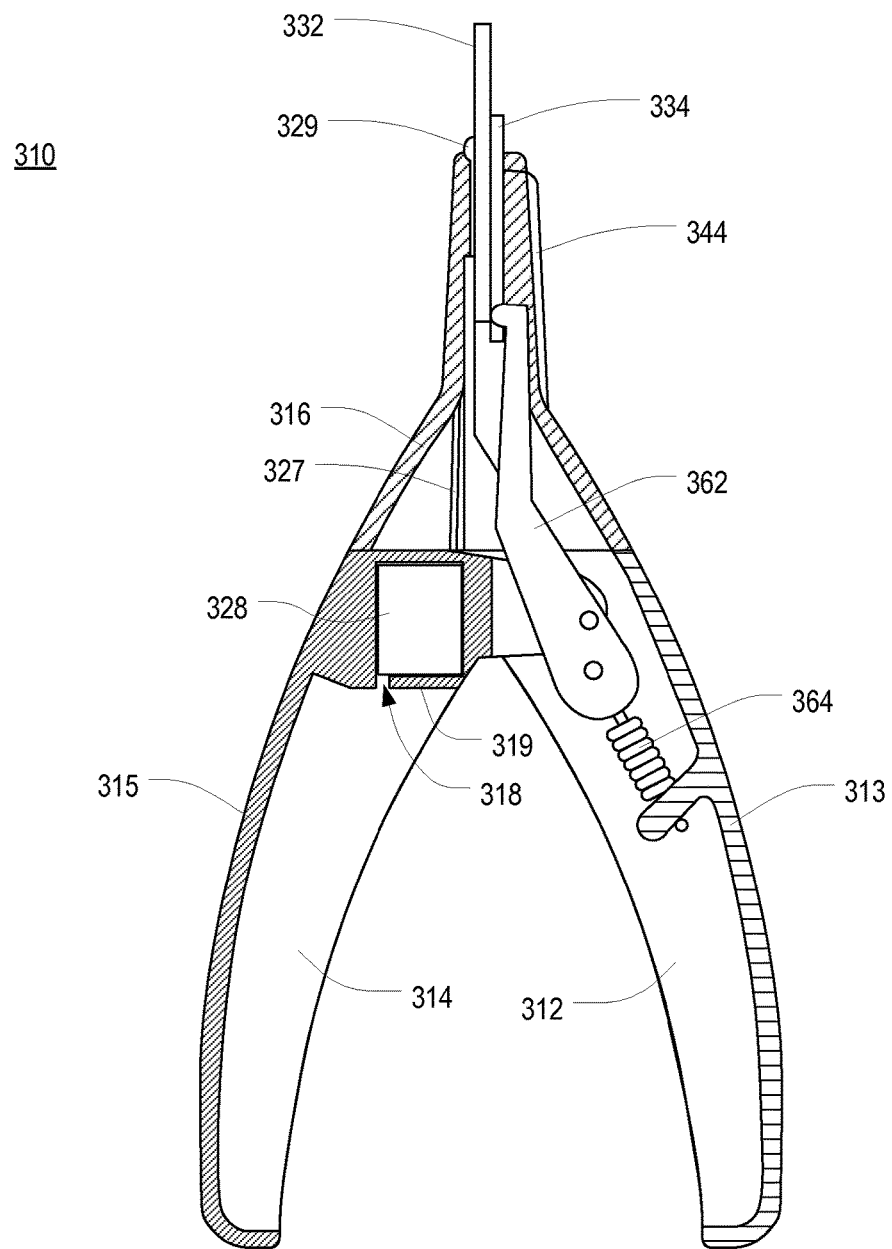
FIG. 12 is a side cross-sectional view of the internally lighted guillotine-type nail trimmer of FIG. 11.
Figure 13:
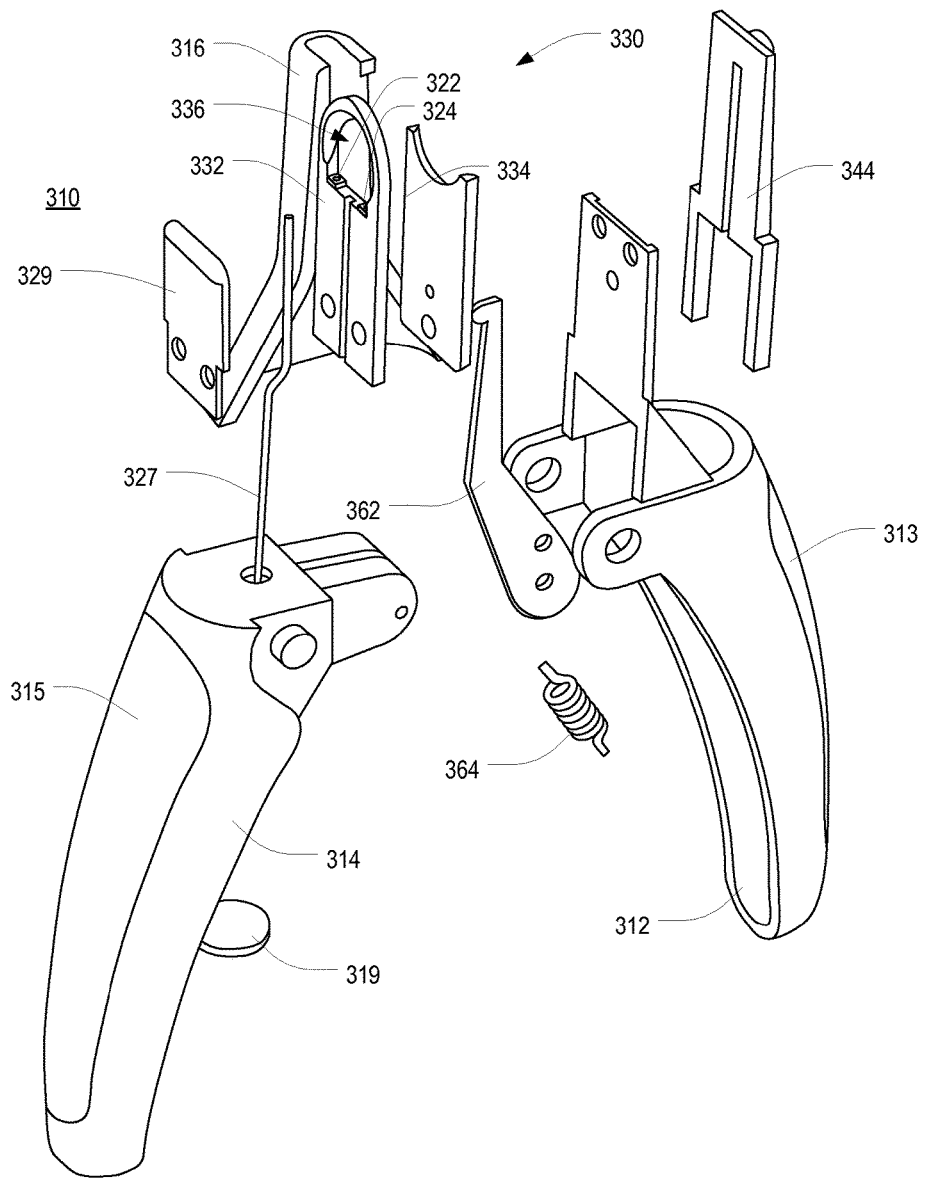
FIG. 13 is an exploded side orthogonal view of the internally lighted guillotine-type nail trimmer of FIG. 11.

FIG. 11 is a side view of an internally lighted guillotine-type nail trimmer 310 in accordance with another preferred embodiment of the present invention. FIG. 12 is a side cross-sectional view of the internally lighted guillotine-type nail trimmer 310 of FIG. 11. FIG. 13 is an exploded side orthogonal view of the internally lighted guillotine-type nail trimmer 310 of FIG. 11. As shown therein, the nail trimmer 310 includes a pair of handles 312,314, a main housing 316 (only one half of which is illustrated in FIG. 13), a guillotine assembly 330, and a light assembly 320. The handles 312,314 and main housing 316 are generally conventional in design, but with allowance to accommodate the light assembly 320 and guillotine assembly 330. Each handle 312,314 may include a grip 313,315.

The light assembly 320 and guillotine assembly 330 are at least partially housed in, or extend from, the main housing 316 and one or both handles 312,314. As shown therein, the guillotine assembly 330 includes a stationary blade or frame 332, a moving blade 334, and a cutting blade indicator 344. In some embodiments, the stationary blade or frame 332 does not include a sharpened cutting edge, while in other embodiments it does. The stationary blade or frame 332 and moving blade 334 together define a cutting opening 336. The two blades 332,334 may be coupled together in conventional manner such that the moving blade 334 slides back and forth relative to the stationary blade or frame 332. As is well known, when the moving blade 334 slides out of its normal, recessed position and toward (into) the cutting opening 336, the diameter of the cutting opening 336 is reduced.

Movement of the moving blade 334 may be achieved, for example, via a pivot arm 362 that is coupled at one end to the moving blade 334 and is pivotably coupled near its other end to one of the handles 314, which serves as a lever. Thus, movement of the moving blade 334 may be actuated somewhat conventionally by squeezing the handles 312,314 together, thus pushing the moving blade 334 out of the housing 316. This enables a considerable amount of force to be applied to a pet nail 50 that is inserted into the cutting opening 336, but with a relatively minimal effort. As is conventional, the moving blade 334 tends to catch and pin the nail 50 against the stationary blade or frame 332, and once trapped, to cut or cleave the pet nail 50 at the point of contact. The moving blade 334 is then retracted within the housing 316 once again when the lever handle 314 is returned to its original position, with assistance in this regard provided by a spring 364 that is stretched when the handles 312,314 are squeezed and thus tends to pull the handles 312,314 apart when the handles 312,314 are released.

The light assembly 320 includes at least one and preferably two small light sources 322,324 disposed within the guillotine assembly 330 and directed toward the cutting opening 336. The lights 322,324 are preferably very small surface-mount LED lights that are installed in a slot 338 in the steel frame of the guillotine assembly 330. Simple white LEDs may be used, but in some embodiments, various other LEDs or other light sources, producing light with various wavelengths, may be substituted. For example, the use of UV LEDs, providing near-ultraviolet ("black") light, may provide increased visual contrast. As a non-limiting example, it may be useful to incorporate UV LEDs providing 415 nm UV light. It will be appreciated that light may be provided in any visible wavelength without departing from the scope of the present invention.

The light assembly 320 may also include a switch assembly (not shown), which in some embodiments includes a momentary switch that is actuated when the handles 312,314 are squeezed together. In other embodiments, the switch assembly is a multi-position switch assembly to enable the lights 322,324 to be activated separately or simultaneously. A three position slide switch may be utilized. Additionally or alternatively, a switch contact (not shown) may be used to activate the illumination when a safety (for example, a mechanical safety that holds the handles in a fixed position relative to each other in order to prevent unintentional cutting action by the guillotine assembly but that may be released to enable operability of the guillotine assembly) is released.

As with the trimmer 10 of FIGS. 1-5, one or more internal surfaces of the guillotine assembly 330, such as some or all of the surfaces of the stationary blade or frame 332 that face the cutting opening 336, may be curved or angled such that some or all of the light from the light sources 322,324 is directed or redirected directly toward the cutting opening 336, and thus toward a nail 50 inserted therein. These surfaces may be selectively cut and polished to heighten this effect and to maximize capture and redirection of light.

Power may be supplied to the light assembly 320 via a battery source 328 that is disposed within a compartment 318 and protected by a battery cover 319 in one of the handles 314. Alternatively, the battery source may be disposed in the other handle 312, the main housing 316, or any combination thereof. The battery source 328 may be a single AAA alkaline cell, three watch batteries, or any other suitable battery source. Electrical wiring 327 connects the battery to the lights 322,324. The wiring 327 may be protected by a cover 329.

Figure 18:
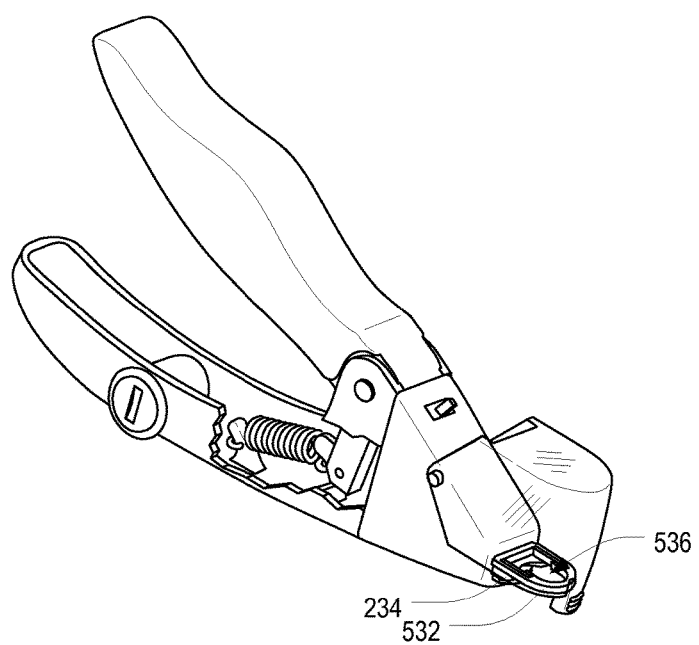
FIG. 18 is a partially fragmentary side orthogonal view of an internally lighted guillotine-type nail trimmer in accordance with another preferred embodiment of the present invention.

FIG. 18 is a partially fragmentary side orthogonal view of an internally lighted guillotine-type nail trimmer 510 in accordance with another preferred embodiment of the present invention. This trimmer 510 includes a pair of handles, a main housing, a guillotine assembly, and a light assembly. The handles and main housing are similar to those of the trimmer of FIGS. 8-10, and the light assembly and guillotine assembly are at least partially housed in, or extend from, the main housing and one or both handles.

Figure 19:
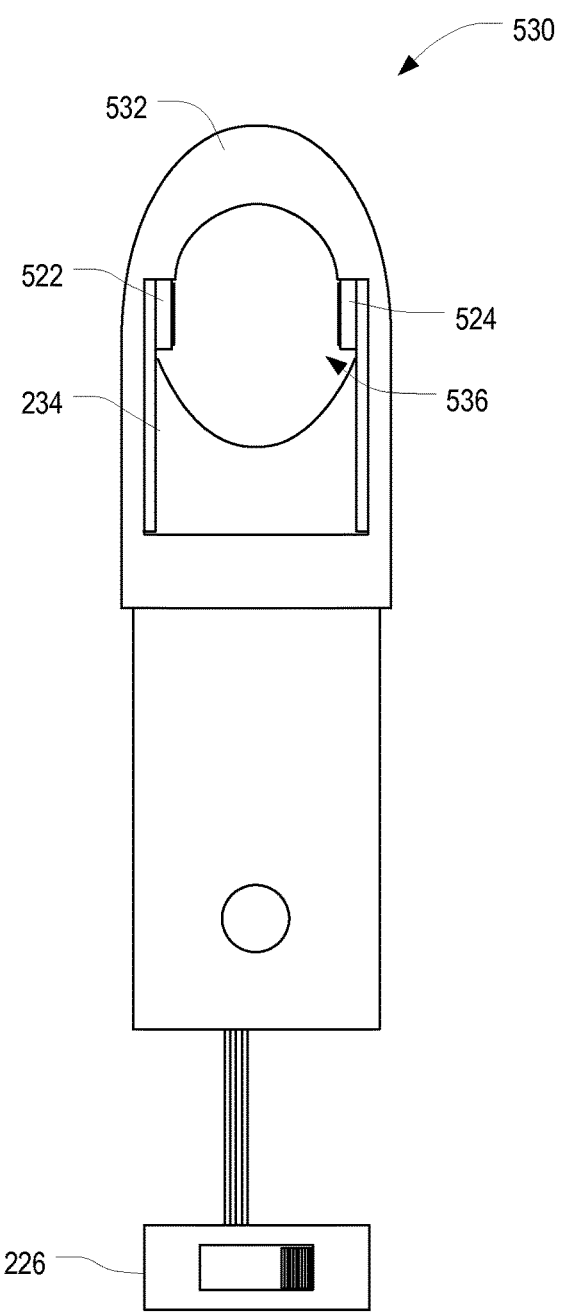
FIG. 19 is a top view of the light assembly and guillotine assembly of FIG. 18.

FIG. 19 is a top view of the light assembly and guillotine assembly 530 of FIG. 18. The guillotine assembly 530 includes a stationary blade or frame 532 and a moving blade 234. It may also include a leaf spring that is similar to the leaf spring 265 of the trimmer 210 of FIGS. 8-10. In some embodiments, the stationary blade or frame 532 does not include a sharpened cutting edge, while in other embodiments it does. The stationary blade or frame 532 and moving blade 234 together define a cutting opening 536. The two blades 532,234 may be coupled together in conventional manner such that the moving blade 234 slides back and forth relative to the stationary blade or frame 532. If included, the leaf spring applies pressure to the cutting blade 234 against the blade frame 532 so that torque from the cutting process does not splay them apart. Other designs use an adjustable screw or other structures. Operation of the guillotine assembly 530 and handles is similar to that of the guillotine assembly 230 and handles 212,214 of the trimmer 210 of FIGS. 8-10.

The light assembly includes at least one and preferably two small light sources 522,524 disposed within the guillotine assembly 530 and directed toward the cutting opening 536. The lights 522,524 are preferably very small surface-mount LED lights that are installed along the sides of the steel frame of the guillotine assembly 530. In this trimmer 510, the lights 522,524 are positioned along the sides of the cutting opening 536 and arranged to face each other across the cutting opening 536. In some embodiments, the light sources 522,524 are mounted on and/or attached to the frame 532, although in other embodiments, light sources may be mounted on and/or attached to the moving blade 534. Simple white LEDs may be used, but in some embodiments, various other LEDs or other light sources, producing light with various wavelengths, may be substituted. For example, the use of UV LEDs, providing near-ultraviolet ("black") light, may provide increased visual contrast. As a non-limiting example, it may be useful to incorporate UV LEDs providing 415 nm UV light. It will be appreciated that light may be provided in any visible wavelength without departing from the scope of the present invention.

The light assembly may include a switch assembly 226, which in some embodiments is a multi-position switch assembly to enable the lights 522,524 to be activated independently or simultaneously. A three position slide switch may be utilized. Additionally or alternatively, a switch contact (not shown) may be used to activate the illumination whenever the handles are compressed together and/or when a safety (for example, a mechanical safety that holds the handles in a fixed position relative to each other in order to prevent unintentional cutting action by the guillotine assembly but that may be released to enable operability of the guillotine assembly) is released.

Power may be supplied to the light assembly via a battery source that is disposed within a compartment and protected by a battery cover in one of the handles. Alternatively, the battery source may be disposed in the other handle, the main housing, or any combination thereof. The battery source may be a single AAA alkaline cell, three watch batteries, or any other suitable battery source. Electrical wiring connects the battery to the lights 522,524. The wiring may be protected by a cover (not shown).

Figure 14:
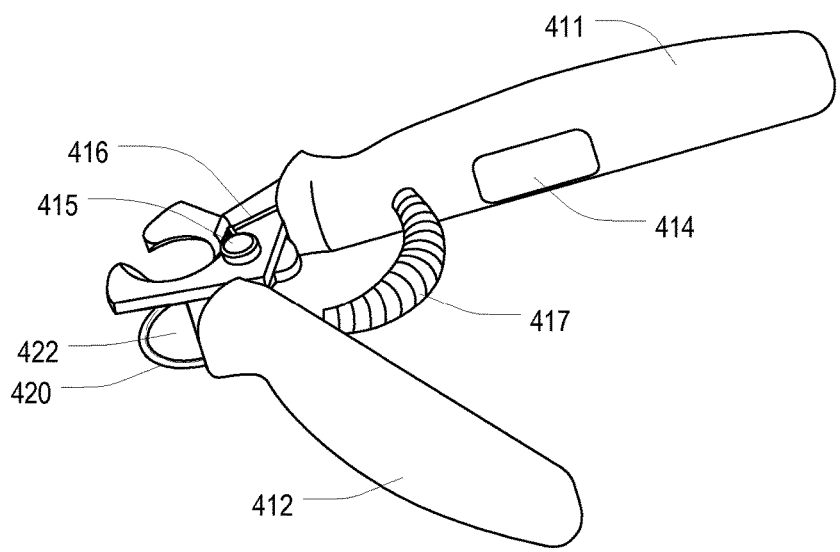
FIG. 14 is a top orthogonal view of an internally lighted scissors-type nail trimmer in accordance with a contemplated commercial embodiment of the present invention.
Figure 15:
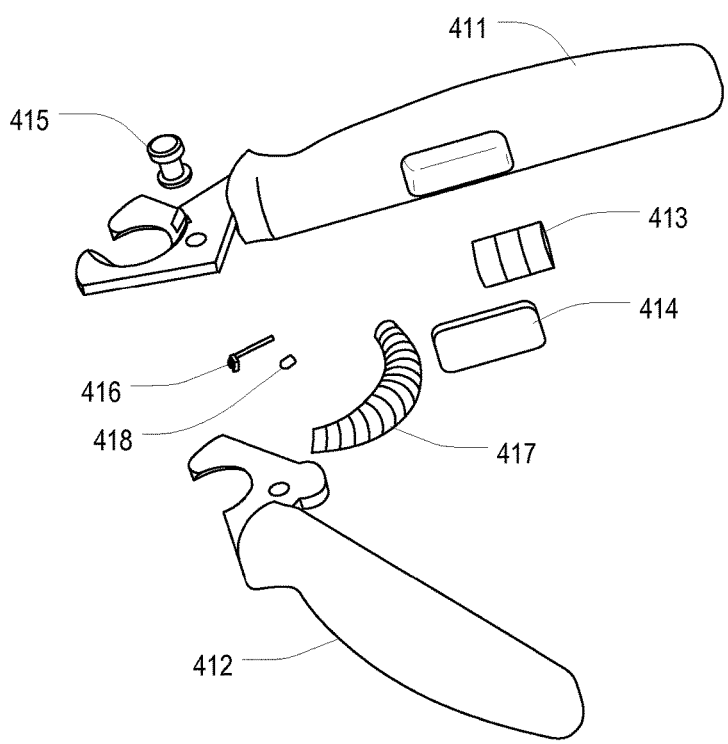
FIG. 15 is an exploded top orthogonal view of the internally lighted scissors-type nail trimmer of FIG. 14.
Figure 16:
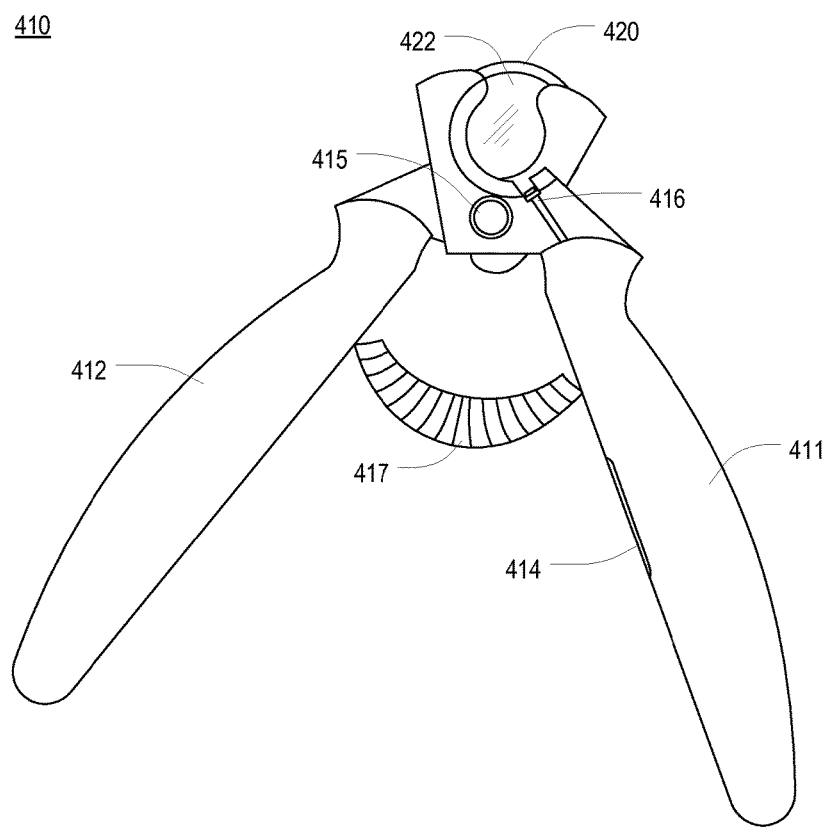
FIG. 16 is a top view of the internally lighted scissors-type nail trimmer of FIG. 14.
Figure 17:
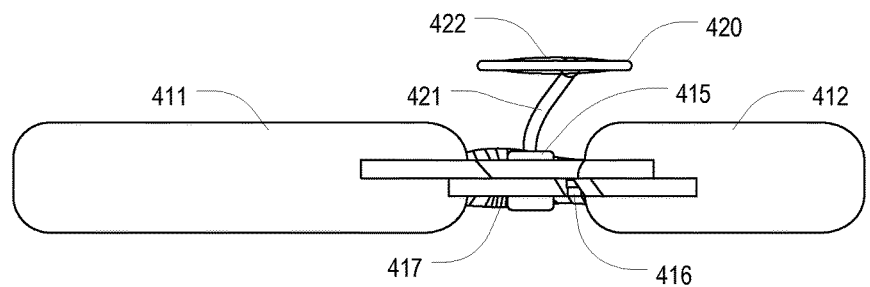
FIG. 17 is a front view of the internally lighted scissors-type nail trimmer of FIG. 14.

Many of the same principles may be applied to other types of nail trimming devices, such as scissors-type nail trimmers. In this regard, FIG. 14 is a top orthogonal view of an internally lighted scissors-type nail trimmer 410 in accordance with a contemplated commercial embodiment of the present invention. FIG. 15 is an exploded top orthogonal view of the internally lighted scissors-type nail trimmer 410 of FIG. 14, shown without a magnifier; and FIGS. 16 and 17 are a top view and a front view, respectively, of the internally lighted scissors-type nail trimmer 410 of FIG. 14. As shown therein, the scissors-type nail trimmer include a pair of scissor arms 411,412, a battery 413, a battery cover 414, a rivet 415, circuits 416, a return spring 417, and a momentary switch 418. Each of the scissor arms 411,412 includes a scissor blade to which a handle is co-molded. The battery 413 is disposed within a cavity 419 in one handle 411 and is protected by the cover 414.

It will be appreciated that the light arrangement illustrated in the scissors-type nail trimmer 410 of FIGS. 14-17 is exemplary only, and as with the guillotine-type nail trimmers described and/or illustrated herein, the position and orientation of the light or lights may be changed. For example, rather than using a single light disposed at the end of the circuit 416 in the portion of the blade nearest one of the scissor arms 411 and oriented to direct light in a direction generally parallel (or even generally coaxial with the scissor arm 411), as shown in FIGS. 14-17, various other arrangements, as suggested by the disclosure elsewhere herein, are possible, including a second light being disposed directly across from the first light in the same blade, a second light being disposed in a similar location (relative to the second scissor arm 412) in the portion of the other blade nearest the second scissor arm 412, one or two lights being disposed along sides of one or both of the blades, and the like.

Furthermore, a manually-triggered switch assembly may additionally or alternatively be provided to activate one or both lights. In some embodiments such switch may be a multi-position switch assembly that enables two or more lights (if provided) to be activated independently or simultaneously. A three position slide switch may be utilized. Additionally or alternatively, a switch contact (not shown) may be used to activate the illumination whenever the scissor arms 411,412 are compressed together and/or when a safety (for example, a mechanical safety that holds the scissor arms in a fixed position relative to each other in order to prevent unintentional cutting action by the blade assembly but that may be released to enable operability of the blade assembly) is released.

A magnifier 420 may be included to provide visual enlargement of the interior operational area to a user. In the illustrated embodiment, the magnifier 420 includes a conventional biconvex lens 422 tethered to the rivet or a portion of one of the scissor arms 411,412 via flexible gooseneck 421 such that the lens 422 may be positioned or oriented as desired. Other magnifiers are likewise suitable. However, the magnifier may certainly be omitted, or in some embodiments, the magnifier may be removable. In some of the latter embodiments, the magnifier may be detachable and reattachable.

In an additional optional feature, a small brush, felt tip, "magic marker" tip, or other applicator may be built into at least one of the handles, scissor arms, or other component of any of the internally lighted nail trimmer disclosed herein. The applicator may be utilized to apply a light coating of mineral oil to a pet nail in order to make the nail more translucent and thereby easier to cut. In at least some of these embodiments, the handle, scissor arm, or the like includes a built-in reservoir of mineral oil to simplify such process.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A pet nail trimmer, comprising:
   a pair of handles;
   a housing;
   a guillotine assembly, extending from the housing and actuated by the handles, the assembly including a blade and a frame that are in parallel to one another and that define a cutting opening that includes a first end nearest the handles, a second end opposite the first end, and two sides;
   a light, disposed within and along a first of the two sides of the cutting opening, adjacent the blade and the frame, and oriented to direct light across the cutting opening from the first side thereof toward the second side thereof, the light being directed in a direction that is generally perpendicular to the handles; and
   wherein the blade and frame combined have a top-to-bottom thickness, and wherein the light is disposed within the top-to-bottom thickness of the thickness of the combined blade and frame.

2. The pet nail trimmer of claim 1, wherein the frame includes a cutting edge.

3. The pet nail trimmer of claim 1, wherein the blade is arranged to move in a longitudinal direction along the frame.

4. The pet nail trimmer of claim 1, wherein the light is oriented to direct light in a direction that is co-planar with at least one of the blade and frame.

5. The pet nail trimmer of claim 1, wherein a magnifier is positioned adjacent the cutting opening.

6. The pet nail trimmer of claim 5, wherein the magnifier includes a convex lens disposed over, and in parallel to, the cutting opening.

7. The pet nail trimmer of claim 5, wherein the magnifier includes a box-like structure surrounding the cutting opening and having convex walls.

8. The pet nail trimmer of claim 7, wherein the box-like structure is hinged so as to enable the structure to be rotated away from the cutting opening.

9. The pet nail trimmer of claim 1, wherein the light is a first light disposed within and along a first side of the cutting opening, wherein the pet nail trimmer includes a second light disposed within and along a second side of the cutting opening adjacent the blade and the frame and facing the first light, and wherein the second light is oriented to direct light across the cutting opening from the second side thereof toward the first side, the light being directed in a direction that is generally perpendicular to the handles.

10. The pet nail trimmer of claim 9, wherein the first and second lights are oriented to direct light toward each other across the cutting opening.

11. The pet nail trimmer of claim 1, wherein the light is attached to the frame of the guillotine assembly.

12. The pet nail trimmer of claim 1, wherein, of the guillotine assembly, one of the blade and the frame is stationary relative to the housing and the other of the blade and the frame is movable relative to the housing, and wherein the light is attached to the one of the blade and the frame that is stationary.

13. The pet nail trimmer of claim 1, wherein the blade is movable relative to the frame, wherein movement of the blade relative to the frame defines a direction of translation, and wherein the light is directed in a direction that is generally perpendicular to the direction of translation.

14. The pet nail trimmer of claim 1, wherein the cutting opening is defined by the blade and frame such that inward-facing surfaces of the blade and frame form side walls of the cutting opening, and wherein the light is disposed against the side walls of the cutting opening.

15. The pet trimmer of claim 1, wherein the light does not protrude above the top surface of the guillotine assembly and does not protrude below the bottom surface of the guillotine assembly.

16. A pet nail trimmer, comprising:
a pair of handles;
a housing;
a guillotine assembly, extending from the housing and actuated by the handles, the assembly including a blade and a frame that are in parallel to one another and that define a cutting opening that includes a first end nearest the handles, a second end opposite the first end, and two sides;
a first light, disposed within and along a first of the two sides of the cutting opening, adjacent the blade and the frame; and
a second light, disposed within and along a second of the two sides of the cutting opening, adjacent the blade and the frame;
wherein the blade and frame combined have a top-to-bottom thickness, and wherein the light is disposed within the top-to-bottom thickness of the thickness of the combined blade and frame;
wherein the first and second lights are oriented to direct light toward each other across the cutting opening.

17. A pet nail trimmer, comprising:
a pair of handles;
a housing;
a guillotine assembly, extending from the housing and actuated by the handles, the assembly including a blade and a frame that are in parallel to one another and that define a cutting opening that includes a first end nearest the handles, a second end opposite the first end, and two sides, wherein the blade is movable relative to the frame, and wherein movement of the blade relative to the frame defines a direction of translation;
a light, disposed within and along a first of the two sides of the cutting opening, adjacent the blade and the frame, and oriented to direct light across the cutting opening from the first side thereof toward the second side thereof, the light being directed in a direction that is generally perpendicular to the direction of translation; and
wherein the blade and frame combined have a top-to-bottom thickness, and wherein the light is disposed within the top-to-bottom thickness of the thickness of the combined blade and frame.

* * * * *